Aug. 18, 1970 U. VOLKER ET AL 3,524,774
SOLDERING MATERIAL
Filed May 18, 1967

INVENTORS
Ulrich Völker &
Günter Gerloff

BY *Otto John Munz*
ATTORNEY

3,524,774
SOLDERING MATERIAL
Ulrich Volker and Gunter Gerloff, Reinbek, Germany, assignors to Jurid Werke G.m.b.H., Glinde, Germany
Filed May 18, 1967, Ser. No. 639,421
Claims priority, application Germany, May 25, 1966,
J 30,923
Int. Cl. B23k 35/30
U.S. Cl. 148—22                                                                 1 Claim

ABSTRACT OF THE DISCLOSURE

The porous, absorbent products of powder metallurgical manufacturing operations are brazed and soldered by using a soldering material that is a mixture of powders of solder, meltable at the soldering temperature, and a substance that does not melt at the soldering temperature.

FIELD OF THE INVENTION

The invention relates to a soldering method for bonding porous materials which tend to absorb molten solder, particularly for those materials which are obtained by sintering processes. The invention also relates to a soldering material for use in the method of the invention.

DESCRIPTION OF THE PRIOR ART

The mode of action of a solder is based on the fact that the solder material, which is converted into the molten phase, flows at the contact points between the parts to be soldered to one another and solidifies there. In the course of this, the parts are connected to one another not only through the solder material but also through intermediate layers which represent alloying layers between the solder and the materials of the parts to be soldered. The formation of these intermediate layers and hence the soldering is all the more successful the more wettable are the materials to be joined.

The satisfactory wettability, which is thus the fundamental prerequisite for the durability of the soldered joint, always leads to difficulties if attempts are made to connect structural parts obtained by powder metallurgy to one another or to a support; this includes the cermet materials. In attempting to join such porous materials to one another or to metallic supports by means of known solder materials, the capillary forces of the porous material are generally so high that the solder is immediately absorbed by the sponge-like structure at the moment of liquefaction.

In order to avoid such difficulties, an attempt has already been made to use solder materials with a wide range between the solidus and liquidus. This leads to a conversion of the solder material into a pasty state in the soldering-temperature range. This pasty soldering compound, in many cases, however, proves unable to wet sufficiently the surfaces of the structural parts to be joined so that no durable soldering comes about.

OBJECTS OF THE INVENTION

Objects of the invention are therefore to provide a method for soldering powder metallurgical parts and to provide compositions for solder material which, on the one hand, has an adequate wetting capacity but on the other hand, is not absorbed by the porous sintered materials despite conversion into the molten state.

SUMMARY OF THE INVENTION

A solder material according to the invention is characterized in that it is composed of a powder mixture of two main components, one of which components consists of one or more metals which can be melted at the soldering temperature, thus falling under the conventional designation, "solder." The other component, which is present in an intimate mixture with the metals which can be melted, is a powdered substance having a melting point higher than that of the solder and consists of metals, salts and/or oxides, the melting point of which is above the soldering temperature.

The wetting capacity of the fusible solder component may be improved in known manner by the adddition of preferably up to 2.5% by weight of specific substances to be designated later.

During the soldering operation, a porous fine capillary skeleton, the capillary forces of which are greater than those in the porous material to be soldered, forms in the interface between the parts to be soldered together. The substance having a higher melting point may preferably amount from 10 to 90% by weight, depending on the porosity of the materials to be soldered. The solder is only surrendered to the bonding surfaces to be soldered, particularly the porous surface, to the extent to which excess melt arises in consequence of the sintering together of the higher-melting substance and the reduction in volume associated therewith.

It is necessary in this invention that the higher-melting substance not be dissolved at soldering temperatures by the solder component. Thus attack on the higher-melting substance arising, for instance, because of the presence of a eutectic composition between the solder and the higher-melting substance, should be avoided by the proper choice of combinations. Or, at least, the kinetic rate of dissolution of the higher-melting substance should be small, so that hte higher-melting powder does not become ineffectively fine during the time of soldering.

It is an advantage if the solder material of the invention is used in the form of pre-pressed and possibly also pre-sintered moulded articles, for example electrode strands.

Moulded articles give a particularly novel result for the joining of parts when the gaps resulting on placing the parts together are wider than permissible with known soldering techniques. They also eliminate the danger of a non-uniform distribution of the higher-melting substance in the interface between the bonding surfaces of parts to be joined. This danger is especially high when one of the parts is porous and absorbent.

It is further possible to close faulty points in the surfaces of structural parts by means of elements composed of the new solder material and possibly specially shaped. In this case, it is not even necessary to bring the parts to be repaired into a specific position first; the repair can be carried out with the workpiece in any position because the porous fine-capillary skeleton blob forms immediately on melting of the fusible component and, as a result of its capillarity, retains its blob form even against the force of gravity. Soldering materials of the kind of the invention may be produced for soldering in every temperature range. Through suitable choice of the solder component according to information available in the prior art concerning solders, adaptation to the properties of the materials to be soldered is possible.

Examples of materials for the fusible part of the solder material are: platinum, gold, rhodium, silver, copper, zinc, tin, cadmium, lead, brass, bronze and other usual commercial solders. The particular solder used in a given powder mixture can be any solder suitable for use in bonding a non-porous part otherwise having the same metallurgical characteristics as the porous part.

The following substances may be added in order to improve the wettability: phosphorus, silicon, and all usual commercial fluxes in a proportion of preferably up to 2.5% by weight. By "usual" flux is meant a flux that would be usable according to the teachings of the prior art in a soldering operation, wherein the high-melting substance and the porous and absorbent characteristic of the parts are not present.

Particularly favourable materials for building up the porous fine-capillary network in hard solders according to the invention are pulverized iron, cobalt, nickel, tungsten, molybdenum, alone or in mixtures at grain sizes less than 0.06 mm. For soft solders of the kind according to the invention, the same vehicle or skeleton-materials may be considered for the network as for hard solders, and in addition presintered alloys on a copper base which have melting points between 480 and 600° C. and grain sizes also less than 0.06 mm. Powdered metal salts, for example phosphides and halides such as zinc iodide, silver chloride, boron chloride, lead and copper bromide may be used.

The two examples of soldering materials according to the invention and given below are novel and especially successful for soldering powder metallurgical parts. They are to be considered to be limited forms of the invention.

The method of the invention comprises preparing the powder mixture of the powdered solder and powdered high-melting substance heretofore described and then soldering two parts, at least one of which is porous and absorbs molten solder, together using the resulting powder mixture as a soldering material. The term "soldering" is meant to include all the various methods of soldering used in the prior art of soldering and brazing, it being understood that the soldering material can be supplied to the bonding region in all physical forms used in the prior art during steps of soldering. During soldering, a temperature is used which is above the melting temperature of the solder and below the melting temperature of the higher-melting substance, where "melting temperaure" is meant to include the solidus temperature of an alloy.

Other objects and many of the attendant advantages of this invention will be readily appreciated as the same becomes better understood by reference to the following detailed description when considered in connection with the accompanying drawings in which like reference numerals designate like parts throughout the figures thereof.

DESCRIPTION OF THE PREFERRED EMBODIMENTS

For the special application wherein porous iron sintered materials, having a high graphite content and not easily wettable, are to be soldered onto steel supports, a copper-tin-bronze with a low phosphorus content is selected for the fusible component of the hard solder in order to improve the wettability. For the development of the fine capillary skeleton, nickel powder prepared from carbonyl nickel and having a grain size of less than 0.06 mm. proves particularly useful, because despite its high melting point, it clearly has adequate sinter activity at the soldering temperature.

This advantageous solder material has the following composition:

Cu—39.85% by weight, grain size less than 0.1 mm. greater than 0.06 mm.
Sn—10% by weight, grain size less than 0.1 mm. greater than 0.06 mm.
P—0.15% by weight, grain size less than 0.06 mm.
$Cu_3P$—30% by weight, grain size less than 0.15 mm.
Ni—20% by weight, grain size less than 0.06 mm.

Figure 3:
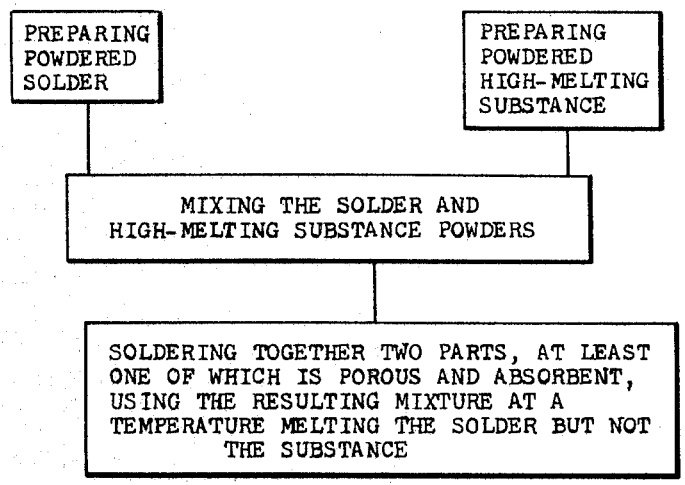
FIG. 3 is a flow diagram of the method of the invention.
Figures 1, 2:
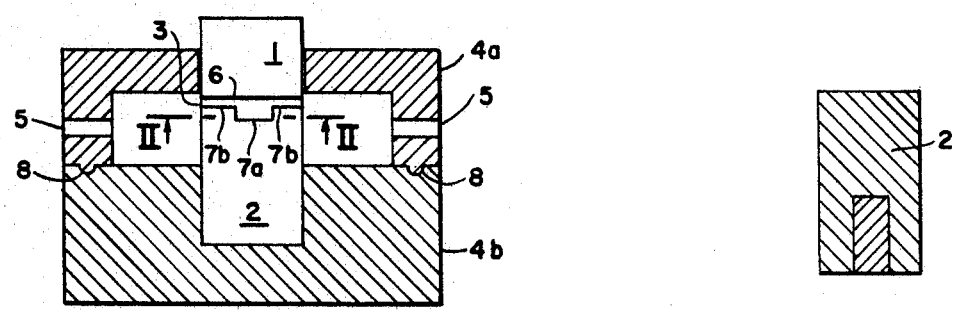
FIG. 1 is an elevational view, partly in section.
FIG. 2 is a sectional view along the line II—II of FIG. 1.

The method of the invention is broadly outlined in FIG. 3. In the case of FIGS. 1 and 2, the above powders are mixed to a uniform distribution and then pressed at 2 mp./cm.$^2$ and presintered in a furnace at 800° C. The finished compact 3 is a plate with a rectangular parallelepiped boss. As shown in the drawings, the compact is placed between a steel part 1 and a powder-metallurgically produced part 2 having an iron powder base and a high graphite powder content. The boss fits into a correspondingly hollowed location in the part 2. Without the boss, the bonding surfaces 6 and 7a would be too far apart for successful bonding. The assembly is placed in a jig 4 to prevent lateral movement of the two parts at soldering temperature and then placed in a furnace, where the entire assembly is brought to a temperature sufficient to melt the copper-tin-bronze solder. Cooling follows.

The jig 4 is shown in cross section in FIG. 1. Its lateral sliding fit on parts 1 and 2 allows part 1 to move slightly downwards under gravity when the compact shrinks at the soldering temperature. Holes 5 allow the escape of hot gases. FIG. 1 viewed from the top would show the rectangular shape of part 1 within the similar, but larger rectangular shape of jig 4. Pins 8 enable accurate assembly of the jig halves 4a and 4b.

In order to obtain the solder material in rod form, the powder mixture is pre-pressed at 2 mp./cm.$^2$, presintered in a furnace at 800° C. and brought into the required shape by means of extruding presses.

An advantageous soft-solder material of the kind according to the invention consists of:

Pb—35% by weight, grain size less than 0.06 mm.
Sn—15% by weight, grain size less than 0.06 mm.
$ZnI_2$—50% by weight, commercially precipitated, and is produced in the form of a mixture of the powdered individual components.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claim.

We claim:
1. A soldering material consisting of about the following weights of the following chemicals:
Cu—39.85% by weight, grain size below 0.1 mm., greater than 0.06 mm.
Sn—10% by weight, grain size below 0.1 mm., greater than 0.06 mm.
P—0.15% by weight, grain size below 0.06 mm.,
$Cu_3P$—30% by weight, grain size below 0.15 mm.,
Ni—20% by weight, grain size below 0.06 mm.

References Cited
UNITED STATES PATENTS

| | | | |
|---|---|---|---|
| 1,078,791 | 11/1913 | Maes | 148—24 |
| 2,033,102 | 3/1936 | Berry | 148—24 |
| 2,596,466 | 5/1952 | Bowden | 148—26 |
| 3,281,222 | 10/1966 | Bouton et al. | 148—24 |

L. DEWAYNE RUTLEDGE, Primary Examiner
W. W. STALLARD, Assistant Examiner

U.S. Cl. X.R.
29—495